United States Patent
Birze et al.

(10) Patent No.: US 8,954,541 B2
(45) Date of Patent: Feb. 10, 2015

(54) METHOD, COMPUTER-READABLE MEDIUM, AND SYSTEM FOR DISCOVERY AND REGISTRATION OF CONTROLLED DEVICES ASSOCIATED WITH SELF-DESCRIBING MODULES

(75) Inventors: Brigitte Bernadette Birze, Oak Point, TX (US); Mark Ethard Smith, Garland, TX (US)

(73) Assignee: AMX LLC, Richardson, TX (US)

( * ) Notice: Subject to any disclaimer, the term of this patent is extended or adjusted under 35 U.S.C. 154(b) by 833 days.

(21) Appl. No.: 12/344,723

(22) Filed: Dec. 29, 2008

(65) Prior Publication Data

US 2009/0171474 A1 Jul. 2, 2009

Related U.S. Application Data

(60) Provisional application No. 61/017,613, filed on Dec. 29, 2007, provisional application No. 61/017,620, filed on Dec. 29, 2007.

(51) Int. Cl.
| | |
|---|---|
| *G06F 15/177* | (2006.01) |
| *G05B 19/042* | (2006.01) |
| *G06F 9/54* | (2006.01) |
| *H04L 12/28* | (2006.01) |
| *G06F 9/445* | (2006.01) |
| *G06F 9/46* | (2006.01) |

(52) U.S. Cl.
CPC ........... *G05B 19/042* (2013.01); *G06F 9/54* (2013.01); *H04L 12/2805* (2013.01); *G06F 9/44505* (2013.01); *G06F 9/465* (2013.01); *H04L 12/2807* (2013.01); *G05B 2219/25066* (2013.01); *G05B 2219/25101* (2013.01)

USPC ........................................... 709/220; 719/315

(58) Field of Classification Search
CPC ............... H04L 12/2803–12/2814; H04L 2012/2803–2012/285; G05B 2219/25066; G05B 2219/25101; G05B 19/042; G06F 9/54–9/548; G06F 9/44505
USPC ................ 709/201–207, 220–229, 245; 719/313–317

See application file for complete search history.

(56) References Cited

U.S. PATENT DOCUMENTS

| | | | |
|---|---|---|---|
| 6,564,377 B1* | 5/2003 | Jayasimha et al. ............ | 717/174 |
| 7,904,186 B2* | 3/2011 | Mairs et al. ..................... | 700/83 |
| 2002/0035621 A1* | 3/2002 | Zintel et al. .................. | 709/220 |
| 2003/0101251 A1* | 5/2003 | Low .............................. | 709/223 |
| 2004/0030777 A1 | 2/2004 | Reedy et al. | |
| 2004/0133704 A1* | 7/2004 | Krzyzanowski et al. ...... | 709/250 |
| 2006/0025132 A1* | 2/2006 | Karaoguz et al. ............. | 455/433 |

(Continued)

*Primary Examiner* — Patrice Winder
*Assistant Examiner* — Julian Chang

(57) ABSTRACT

A system, method, and computer-readable medium for the discovery and registration of controlled devices associated with self-describing Modules in a control system are provided. A controlled device associated with a self-describing module is coupled with a master controller on which the self-describing module is installed. A remote monitoring system is communicatively coupled with the master controller, and a remote monitoring system agent is installed on the master controller. The agent discovers a Module associated with the controlled device and queries the Module for a version thereof. The agent then evaluates whether the Module is self-describing. In the event the Module is self-describing, the agent requests a run-time capabilities object from the Module and registers the controlled device with the remote monitoring system according to the capabilities object.

20 Claims, 7 Drawing Sheets

(56) References Cited

U.S. PATENT DOCUMENTS

| | | |
|---|---|---|
| 2006/0031497 A1 | 2/2006 | Beartusk et al. |
| 2006/0271805 A1 | 11/2006 | Pearce et al. |
| 2007/0011271 A1 | 1/2007 | Baker et al. |
| 2007/0043550 A1* | 2/2007 | Tzruya ............ 703/24 |
| 2007/0055757 A1* | 3/2007 | Mairs et al. ............ 709/223 |
| 2007/0055760 A1* | 3/2007 | McCoy et al. ............ 709/223 |
| 2007/0067062 A1* | 3/2007 | Mairs et al. ............ 700/275 |
| 2007/0198728 A1 | 8/2007 | Franceschelli, Jr. et al. |
| 2008/0028288 A1* | 1/2008 | Vayssiere et al. ............ 715/219 |
| 2008/0034123 A1* | 2/2008 | Hirao et al. ............ 709/253 |
| 2008/0120278 A1* | 5/2008 | Roe et al. ............ 707/3 |
| 2008/0313620 A1* | 12/2008 | Oliver ............ 717/151 |

* cited by examiner

US 8,954,541 B2

METHOD, COMPUTER-READABLE MEDIUM, AND SYSTEM FOR DISCOVERY AND REGISTRATION OF CONTROLLED DEVICES ASSOCIATED WITH SELF-DESCRIBING MODULES

CROSS REFERENCE TO RELATED APPLICATIONS

This application claims priority to U.S. provisional patent application Ser. No. 61/017,613, entitled, "Self Describing Devices", filed Dec. 29, 2007, by Birze, et al. and U.S. provisional patent application Ser. No. 61/017,620, entitled, "Sever Enabled Device Description", filed Dec. 29, 2007, by Birze, et al., the disclosures of which are incorporated herein by reference.

FIELD OF THE INVENTION

The present invention is generally related to control systems and, more particularly, to mechanisms for the production of self-describing controlled device Modules in a control system.

BACKGROUND OF THE INVENTION

Many systems, such as control systems, monitoring systems, and the like, exist that allow discovery at runtime of devices active in the system. These systems may also discover a device's type thereby allowing basic control and monitoring with no external configuration. However, these systems depend on standardized application programming interfaces (APIs) describing Parameters, Properties, and Control Commands for different device types. Once a device of a known device type is found, the system can use a standardized API for the device type to control, configure, or monitor the device. For example, some of the attributes of security system device types include Properties, such as a manufacture and model, Parameters, such as arm-able state (ability to arm a system) and security state, (such as ARM_HOME, ARM, DISARM, and PANIC), and Commands (such as GetSecurityStatus, setSeucrityState, and isOKToArm).

Unfortunately, many devices have capabilities that do not fit into standardized device type APIs. This particular trend is becoming more prevalent as manufacturers merge multiple capabilities into a single device, e.g., placing a DVD and a VCR in the same device housing.

Companies that support standardized device type APIs must frequently update their APIs to keep up with the latest innovations by device manufactures. This causes deployment issues as the control, monitoring, and integration systems that understand the APIs must be updated to understand devices using the latest APIs.

Many device protocols allow manufactures to add extensions to their device type API to allow the manufacturers to expose their devices' unique capabilities. However, custom code must then be developed and installed in the control or monitoring system to allow the system to utilize a device's extensions thereby requiring intimate knowledge of the control or monitoring system's internals. Additionally, custom code in a control or monitoring system hampers the ability to swap one device of a type for another of the same type. For example, custom code written for a receiver with custom capabilities will not perform when the receiver is swapped for one that does not have the custom capabilities.

Therefore, what is needed is a mechanism that overcomes the described problems and limitations.

SUMMARY OF THE INVENTION

The present invention provides a system, method, and computer-readable medium for the discovery and registration of controlled devices associated with self-describing Modules in a control system. A controlled device associated with a self-describing Module is coupled with a master controller on which the self-describing module is installed. A remote monitoring system is communicatively coupled with the master controller, and a remote monitoring system agent is installed on the master controller. The agent discovers a Module associated with the controlled device and queries the Module for a version thereof. The agent then evaluates whether the Module is self-describing. In the event the Module is self-describing, the agent requests a run-time capabilities object from the Module and registers the controlled device with the remote monitoring system according to the capabilities object. In the event a Module associated with another device is discovered that is not self-describing, the agent may generate a capabilities object and register the other device with the remote monitoring system according to the generated capabilities object.

In one embodiment of the disclosure, a method of discovery and registration of a controlled device for control thereof is provided. The method includes discovering a Module associated with the controlled device by an agent associated with a remote monitoring system, evaluating whether the module is self-describing, responsive to determining the module is self-describing, requesting a run-time capabilities object from the Module, receiving the capabilities object, and registering the controlled device with the remote monitoring system according to the capabilities object.

In a further embodiment of the disclosure, a computer-readable medium having computer-executable instructions for execution by a processing system, the computer-executable instructions for discovery and registration of a controlled device for control thereof is provided. The computer-readable medium includes instructions that, when executed, cause the processing system to discover a Module associated with the controlled device by an agent associated with a remote monitoring system, query the Module for a version of the Module, evaluate whether the Module is self-describing, responsive to determining the Module is self-describing, request a run-time capabilities object from the Module, receive the capabilities object, and register the controlled device with the remote monitoring system according to the capabilities object.

In a further embodiment of the disclosure, a control system for control of controlled devices deployed therein is provided. The control system includes a controlled device having a self-describing Module associated therewith, a remote monitoring system, and a master controller on which the self-describing Module and an agent associated with the remote monitoring system are installed. The remote monitoring system and the master controller are OSGi-compliant. The agent discovers the Module by invoking an OSGi method, queries the Module for a version of the Module, determines the Module is self-describing, requests a run-time capabilities object from the Module responsive to determining the Module is self-describing, receives the capabilities object, and registers the controlled device with the remote monitoring system according to the capabilities object.

BRIEF DESCRIPTION OF THE DRAWINGS

Aspects of the present disclosure are best understood from the following detailed description when read with the accompanying figures, in which.

DETAILED DESCRIPTION OF THE INVENTION

Figure 1:
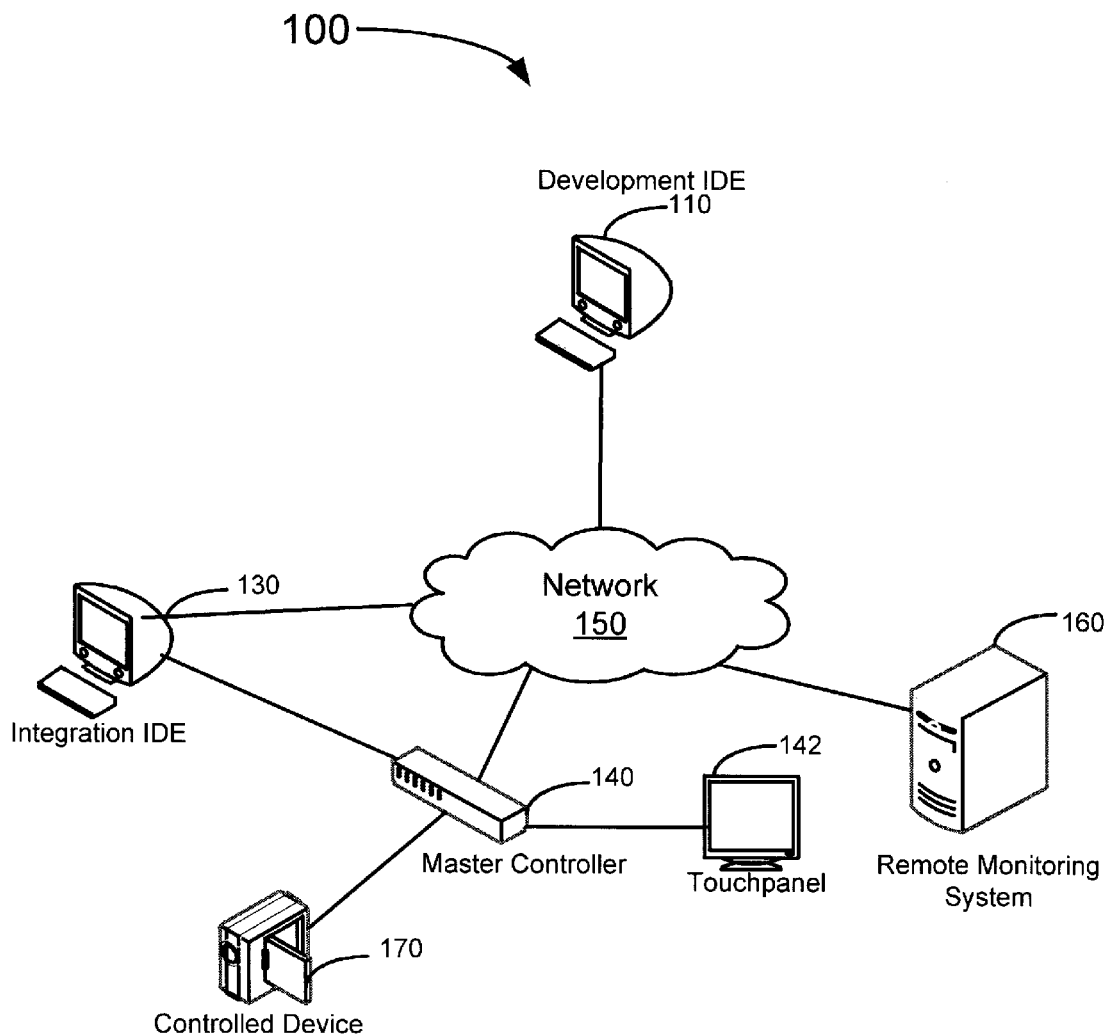
FIG. 1 is a diagrammatic representation of a contemporary control system configuration that provides for control and monitoring of controlled devices deployed in the control system.

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, a self-describing controlled device Module allows a device to describe itself both at runtime and before installation thereby allowing discovery of the capabilities of the device to enable control, monitoring, and integration of a device with no prior knowledge of the device or the device type. Additionally, custom extensions to a device's capabilities will also be discovered to allow control, monitoring, and integration of these custom extensions without the need for custom code. New devices may then be deployed, or communicatively coupled with, control systems, monitoring systems, configuration tools, or development tools and natively understood with no changes to the systems or tools.

Contemporary products may use the application programming interfaces and corresponding device types to provide integration and control of devices in a control system. Exemplary attributes of the Security System device type include Properties, such as manufacture and model, Parameters, and Commands. However, many devices have capabilities that do not fit into such standardized APIs, and the trend is becoming more prevalent as manufacturers merge multiple capabilities into a single device.

In accordance with disclosed embodiments, mechanisms for provisioning a self-describing controlled device Module are provided. As referred to herein a device Module comprises a component that allows a device to be deployed in a control or remote monitoring system (collectively referred to herein simply as a control system). The device Module may be implemented as computer-executable or computer-readable instructions tangibly embodied on a computer-readable medium. A device, such as a camera, tuner, or any other device that may be monitored, controlled, or otherwise manipulated via the control system, is referred to herein as a controlled device. A controlled device has a corresponding device Module that facilitates deployment and operation of the controlled device within the control system. The control system may include various system entities or nodes that facilitate controlled device configuration and deployment, management, operation, control, monitoring, or other manipulations of a controlled device. Control system entities are referred to herein as control system devices (or simply system devices). Exemplary system devices include, for example, a master controller, a remote monitoring system (RMS), and any variety of Integrated Development Environment (IDE) systems or tools used for device integration, deployment or configuration.

The self-describing device Modules implemented according to disclosed embodiments are able to describe the capabilities of a controlled device both at runtime and before installation. Advantageously, the discovery of the capabilities of the device by other system devices with no prior knowledge of the device or its device type is provided. A master controller is able to control the controlled device, an RMS is able to monitor the controlled device, and an integration IDE is able to integrate the device Module with no changes to other control system devices. Additionally, custom extensions to device APIs may be allowed and may also be discoverable to allow control, monitoring, and integration of these custom extensions without the need for custom code.

FIG. 1 is a diagrammatic representation of a contemporary control system 100 configuration that provides for device control and monitoring in control system 100. A controlled device development IDE 110 may be used by device manufactures, e.g., a manufacturer of a controlled device 170, to develop a Module for the corresponding controlled device. Alternatively, the development IDE 110 may be used by manufacturers or developers of control system devices. A Module provides customized control and monitoring for a specific controlled device model from a specific manufacturer in a control system 100.

An integration IDE 130 allows device dealers to easily integrate multiple Modules and their associated controlled devices into a single control system 100. An integration tool run at integration IDE 130 may provide a visual mechanism of generating Touchpanel glue code to tie, for example, touch panel 142 inputs with each device Module's API to control and monitor the associated device.

Modules integrated with integration IDE 130 may be loaded onto a master controller 140 to enable control of the corresponding devices in the control system 100. NetLinx code generated by integration IDE 130 may also be loaded onto the master controller 140 to link touch panels, or other peripheral devices, with the control and monitoring APIs exposed by the device Modules generated by development IDE 110.

A remote monitoring system (RMS) 160 may feature a resource management suite that provides remote monitoring and control of various controlled devices 170 integrated in control system 100. The RMS 160 may comprise an RMS server that communicates with RMS agents installed on the system master controller 140. The RMS enables administrators to gather status of controlled devices and to control the devices participating in the control system 100 that are deployed via the master controller 140. Various control system devices are communicatively coupled with one another, e.g., via a network 150, a direct connection, or another suitable interface.

Contemporary API specifications create a control system which provides rigid device development, yet does not provide effective runtime enforcement. This introduces ambiguity and creates issues for control system devices or products collaborating to provide control and monitoring for controlled devices deployed in control system 100.

A control system device software development kit (SDK) composed of SDK components is used to create Modules for controlled devices. SDK components each expose an API that describes the mechanisms for controlling and monitoring the common device component. For example, a Power Supply is a device component used in many device types and thus may have a corresponding Power Supply SDK component at the development IDE 110.

Typical SDK components are grouped into well know device types which are rigid in their structure. These well known device types cannot easily account for device innovations in the form of new functionality or combinations of different device types. For example, a VCR comprises a power supply, a television tuner, and a tape transport. A device type specified as a VCR may then have a respective SDK component for the power supply, television tuner, and the tape transport. In a similar manner, a DVD player comprises a power supply and a disc transport. A device type specified as a DVD player may have a respective SDK component for the power supply and the disc transport. In this manner, well known device types may be accommodated by various automated tools for configuration and deployment in a control system. However, consider a manufacturer that has produced a DVD/VCR combination. In this instance, another device type must be defined for efficient deployment of the DVD/VCR combination since neither the SDK components grouped into the VCR device type nor the SDK components of the DVD device type may appropriately address the combination device.

Module developers may add custom capabilities as custom events, but these are not natively understood by any tools or control system devices or products requiring, for example, custom Touchpanel code to utilize the unique device capabilities. Thus, a device SDK must be disadvantageously updated periodically to accommodate new or modified device types. Consequently, controlled device deployment issues are often encountered as the system master controller 140 can support only one version of the device APIs. If an updated API "breaks" a legacy Module's existing functionality, the legacy Module must be "reopened" to account for the updated APIs in order to function on new control system installations. This ongoing SDK and Module maintenance consumes software engineering and development time, aggravates system partners that may not be aware of SDK updates, and complicates integration and deployment for product dealers.

Integration IDE 130 may import a Module's generated module.xml file to determine the device type and the Commands, Parameters, and Properties available for the Module. This data is checked against the expected Commands, Parameters, and Properties for the device type from the most recent Device SDK API. If there is a mismatch due to an out of date Module, the mismatched commands will not appear in the code builder and thus will not be available to the system integrator. Custom commands and events representing extensions to the standard device type are not exposed to integration IDE 130 and cannot be exposed to the system integrator.

In accordance with disclosed embodiments, a device Module configuration relaxes the rigidity of development while enforcing runtime access to only defined Commands, Parameters, and Properties. This shift in perspective eliminates the frustration of Module developers not being able to "fit" their device capabilities into a pre-defined device SDK. Module developers are able to mix and match standard SDK components to accommodate new device combinations while also creating custom commands and events to capture unique device capabilities in accordance with disclosed embodiments. A development IDE captures this information and generates a framework that describes the capabilities of the Module.

Central to the disclosed controlled device Module implementation is the creation of a capabilities component. When queried, a Module's capabilities component is able to describe its Module's capabilities both as a capabilities object that can be queried at runtime and in an XML format, or other instruction set, that can be saved or passed in messages between control system devices, such as the master controller and RMS. This same capabilities component will be able to create a runtime capabilities object from consuming the self-describing XML file.

Figure 2:
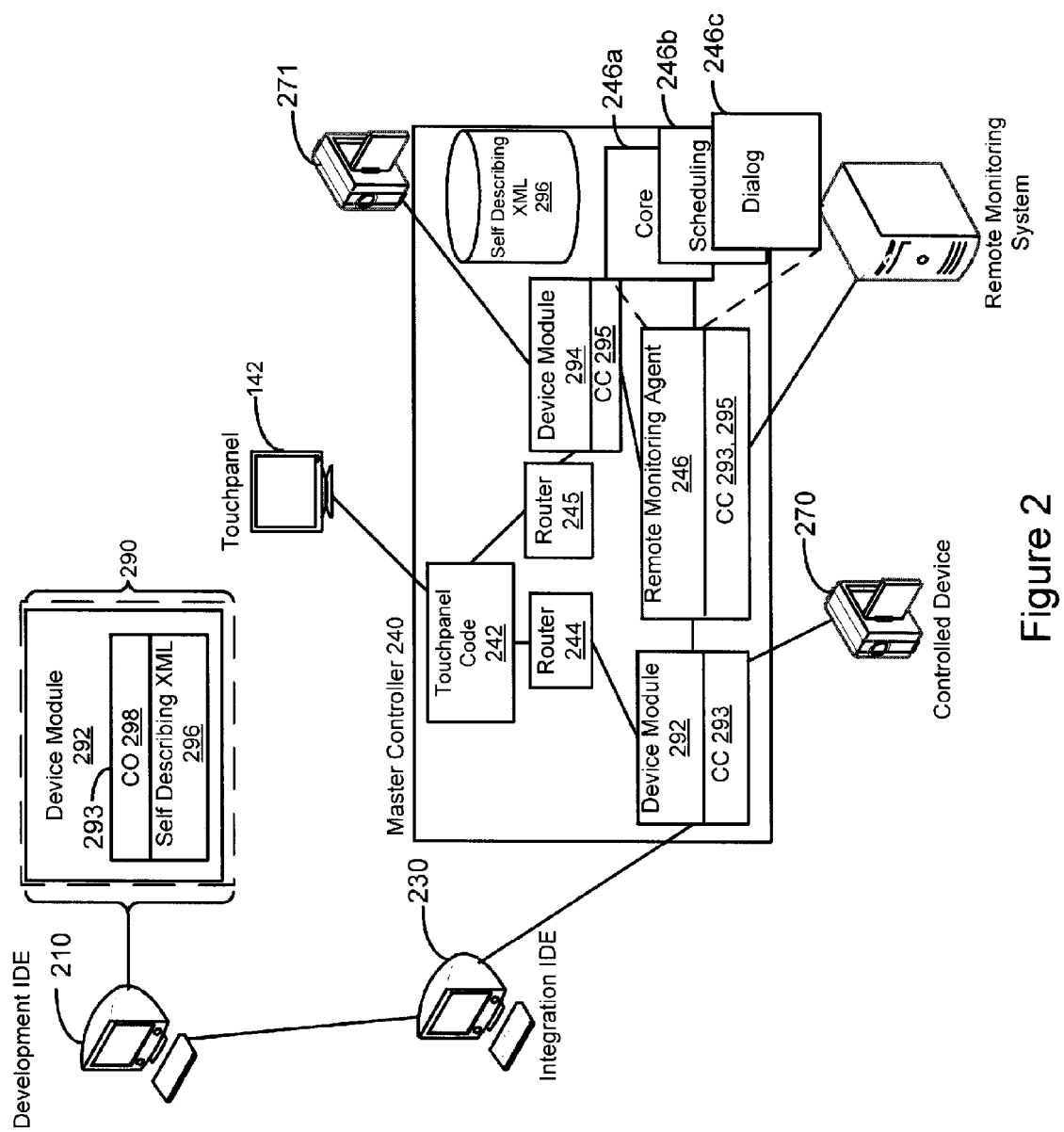
FIG. 2 is a diagrammatic representation of a control system configuration that facilitates controlled device Module development and deployment in accordance with embodiments.

FIG. 2 is a diagrammatic representation of a control system configuration that facilitates controlled device Module development and deployment in accordance with embodiments.

A controlled device Module development IDE 210 may be used by controlled device manufactures, e.g., manufacturers of controlled and monitored devices 270-271, or control system device manufacturers to develop self-describing Modules for corresponding controlled devices.

An integration IDE 230 allows device dealers to integrate multiple Modules and their associated controlled devices into a single control system. An integration code builder tool run at integration IDE 230 may provide a visual mechanism of generating Touchpanel glue code to tie, for example, touch panel inputs with each device Module's API to control and monitor the associated controlled device.

Modules integrated with integration IDE 230 may be loaded onto a system master controller 240 to enable control of the controlled devices in the control system.

An RMS 260 provides remote monitoring and control of various controlled devices 270-271 integrated in control system. The RMS may comprise a resource management suite that communicates with RMS agents installed on the system master controller 240. RMS 260 enables administrators to gather status of controlled devices and to control the devices participating in the control system deployed via master controller 240.

Each Module facilitates control and monitoring for a corresponding controlled device in control system. In accordance with an embodiment, a Module package 290 is produced by development IDE 210 that includes the device Module 292 and a capabilities component (CC) 293 that facilitates device deployment and operation within the control system. In accordance with an embodiment, a CC is provided for each controlled device type. Thus, controlled device 270 may have a CC 293 associated therewith, and controlled device 271 may have a CC 295 associated therewith. The RMS 260 may access each CC 293 and 295 of associated controlled devices 270-271. The Module package, such as Module package 290, and constituent components are associated with a particular controlled device, such as controlled device 270. A corresponding capabilities component 293 includes a self-describing XML file 296, or other suitable instruction set, that specifies the capabilities of the corresponding controlled device 270 including Properties, such as the device manufacturer and model, Parameters, such as controlled device 270 parameter states and status, and commands. As referred to herein, Parameters are mutable values describing the state of the controlled device. Parameters can be queried or delivered as asynchronous events. Properties are immutable values describing the controlled device, such as a manufacturer and model. Control Commands comprise methods which can be invoked to control the device to change the controlled device 270 configuration or state.

A capabilities component, such as CC 293, is configured to be queried by one or more control system devices including configuration, integration, and deployment tools, e.g., integration IDE 230 and RMS 260, and return Module capabilities in response to the query. The Module capabilities may be provided by the capabilities component as the XML file 296 prior to complete operational configuration of the Module 292 and corresponding controlled device 270. Further, the self-describing XML file 296 may be conveyed between one or more control system devices or components. When the device Module 292 and corresponding controlled device 270 are operationally deployed within the control system, a corresponding capabilities component 293 may generate a capabilities object 298 from the self-describing XML file 296. At this point, response to runtime queries issued to the capabilities component 293 may be provided by the capabilities object 298.

Various control system devices, such as the integration IDE 230, RMS 260, and master controller 240 may access a respective capabilities component, such as CC 293. The capabilities component allows for strict enforcement during integration of the corresponding controlled device 270 within the control system and during controlled device 270 runtime.

The controlled device 270 is coupled with the master controller 240 and is thereby provisioned a communication interface with the corresponding Module 292. When the Module and controlled device are operationally configured within the control system 200, supported control and monitoring commands may be conveyed from the Module 292 to the controlled device 270. To this end, the controlled device Module may communicatively interface with a remote monitoring agent 246 that, itself, may be communicatively coupled with RMS 260, e.g., via a network connection, a direct connection, or other suitable communication medium. The remote monitoring agent 246 may include or interface with an instance of the self-describing XML file 296. At runtime, the remote monitoring agent 246 may obtain the capabilities component 293 in the form of the capabilities object 298. When the controlled device is registered with RMS 260, an administrator may issue control and monitoring commands that are received by the remote monitoring agent 246 associated with the controlled device 270.

The controlled device Module 292 additionally interfaces with a controlled device router 244 that is allocated for, and associated with, the controlled device 270. The router 244 is identified and loaded by the master controller 240 to enable communications between Touchpanel code 242 and the code environment, e.g., Java, in which Module 292 is deployed. To this end, Module 292 may include a manifest that specifies the router 244 to be loaded and associated with Module 292, and master controller 240 is configured to examine the Module's manifest for such purposes. When loaded, the router 244 will query the associated Module 292 to discover its capabilities via a returned capabilities object (illustratively represented as a capabilities component 298). Only the capabilities described by the Module 292 will be sent to, or received from, the router 244. Commands or monitoring requests conveyed to the router 244 that are not included in the Module's capabilities object will be returned with a "not implemented" error or other suitable fault. Other controlled devices 271-272 may have corresponding Modules, associated RMS agents, and routers configured on master controller 240.

The control system may accommodate controlled devices, such as a controlled device 271, that has a legacy controlled device Module 294 and a corresponding router 245. Legacy controlled device Module 294 does not have the ability to provide capabilities of the controlled device 273, both rather may only provide a device type and version, e.g., to remote monitoring agent 246.

Figure 3:
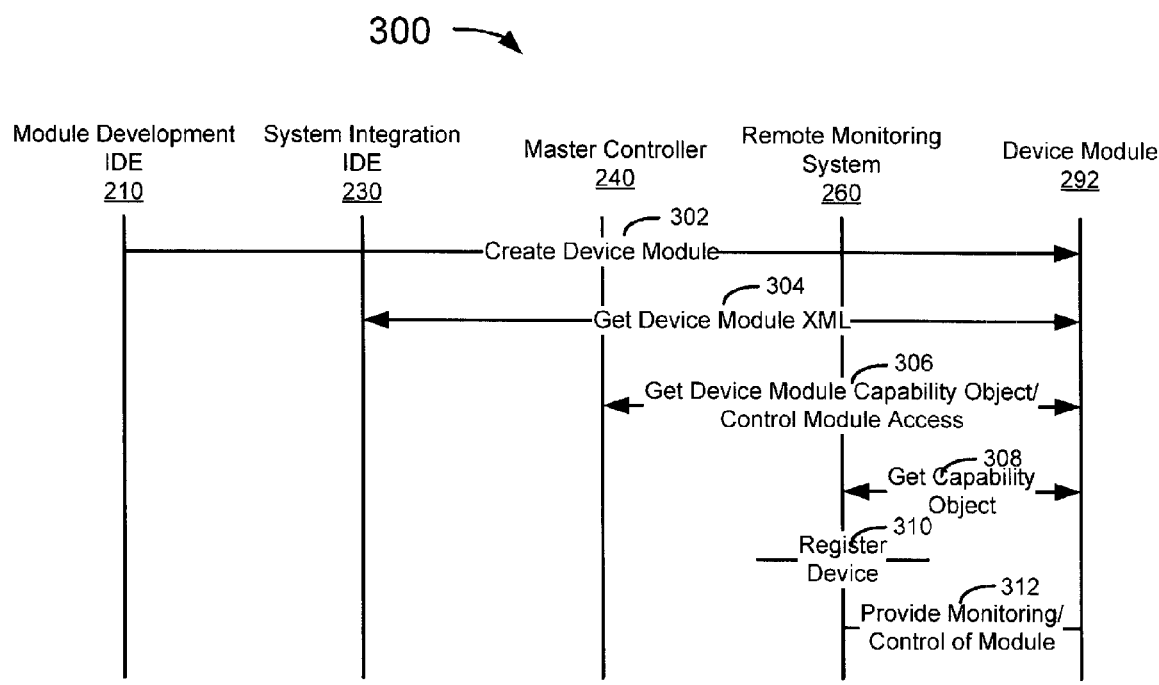
FIG. 3 is a diagrammatic representation of a controlled device Module and controlled device development and deployment work flow implemented in accordance with an embodiment.

FIG. 3 is a diagrammatic representation of a controlled device Module and controlled device development and deployment work flow 300 implemented in accordance with an embodiment.

A device Module is produced at development IDE 210 (step 302). The controlled device Module 292 created at the development IDE 210 includes a self-describing capabilities XML file 296 for use prior to complete configuration of the controlled device 270 and corresponding Module 292 within control system. The Module 292 includes suitable logic for creating and exposing a capabilities object 298 and/or a self-controlled device and Module are operationally configured for use in control system. An integration IDE 230 may then access the controlled device Module 292 to obtain the self-describing XML file 296 (step 304). On receipt of the self-describing XML file 296, the integration IDE 230 use the XML file 296 to integrate the controlled device's exposed capabilities into the control system. Once the device's capabilities are integrated into the control system such that the controlled device and Module are operationally configured, the master controller 240 may retrieve the runtime capabilities object from the Module 292 and thereby control access to the Module and the corresponding controlled device (step 306). The master controller utilizes the runtime capabilities object 298 to allow or prohibit monitoring requests and commands issued for the controlled device 270 according to the capabilities advertised or otherwise provided by the capabilities object 298. The remote monitoring system 260 may likewise obtain the controlled device Module's capabilities object (step 308), and the remote monitoring system may register the controlled device accordingly (step 310). The remote monitoring system uses the capabilities description provided by the capabilities object to advertise the device capabilities to a remote monitoring system administrator. The administrator may then complete a monitoring and control configuration for the device that is constrained by the device capabilities advertised by the controlled device capabilities object. Monitoring and control of the controlled device may then be performed by issuance of suitable commands from the remote monitoring system to the device Module 292 (step 312).

The development IDE 210 used for creation of the device Module according to step 302 may include an SDK that features low-level, reusable, controlled device SDK component building blocks, e.g., power supply, key pad, sensor device, or other common SDK components. However, the use of SDK components for creation of a Module 292 implemented in accordance with embodiments advantageously does not rely on module indexing, e.g., the association of one or more SDKs with a particular controlled device type. Rather, SDK components that are available and that may be utilized for Module development are not bound by a particular device type, and thus Module developers may freely mix and match SDK components. Further, the SDK preferably provides mechanisms for creating custom events and commands for the controlled device that may be accommodated by the corresponding Module. Advantageously, development and deployment of controlled devices within the control system does not require any rigid notion of a device type and a required SDK components association. Module developers are able to create their own device types or, alternatively, start with a known device type and remove or add SDK component at will.

Completed controlled device Modules developed at development IDE 210 are packaged for installation on master controllers. Completed Modules employ a capabilities component 293 to allow the Module to provide a description of the services it offers as both a runtime capabilities object 298 and in a self-describing XML file 296.

Figure 4:
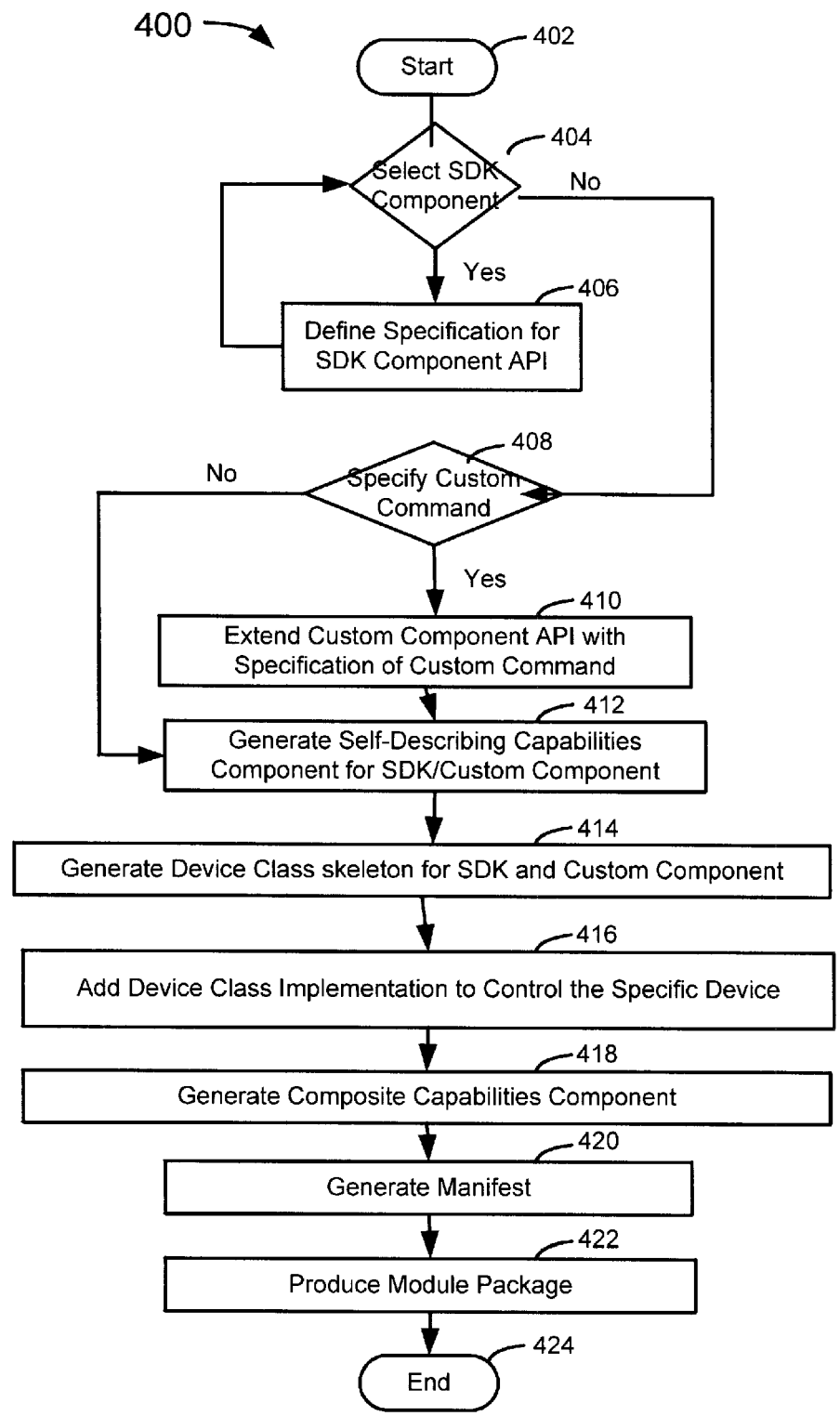
FIG. 4 is a flowchart that depicts a controlled device Module creation routine implemented in accordance with an embodiment.

FIG. 4 is a flowchart 400 that depicts a controlled device Module creation routine implemented in accordance with an embodiment. The processing steps of FIG. 4 may be implemented as computer-executable instructions executable by a processing system, such as the development IDE 210 depicted in FIG. 2.

The Module creation routine is invoked (step 402), and the Module designer may be presented with various SDK components for selection to include in the Module for a corresponding device component (step 404). If the designer selects an SDK component, the metadata on the API is then specified including valid parameter ranges and values, descriptions, etc. (step 406). Specification of the interface API may include specifying one or more commands, parameters, and/or properties and may include the specification of metadata including descriptions, parameters types, and valid ranges. Once the selected SDK component function's interface API has been defined by the designer, the designer may choose an additional SDK component according to step 404.

When no additional SDK components are selected by the Module designer, the designer may be provided an option to specify custom commands (step 408). If the designer so chooses, the designer may extend a custom component API by the specification of custom commands or events for the Module 292 (step 410). In an embodiment, the IDE 210 may provide required fields to facilitate generation of a corresponding custom component. For example, the IDE 210 may require the designer to specify one or more Commands, Properties, and Parameters that are to be associated with the custom command or event, and may require the supply of metadata including descriptive text and valid ranges of the one or more Commands, Properties, or Parameters. After specification of the custom command or event and corresponding Commands, Properties, and/or Parameters and associated descriptive text and metadata, the IDE 210 may then generate a self-describing capabilities component for the SDK/custom component (step 412). The custom component generated by IDE 210 encapsulates the device's custom commands and events. Thereafter, the IDE 210 may then generate a device class skeleton for the SDK and custom component (step 414). A device class implementation is then added to control the specific device (step 416). A composite capabilities component may then be generated from each of the capabilities and custom components (step 418). In an embodiment, the composite capabilities component may comprise a self-describing XML file 296 from which Module 292 may generate a runtime capabilities object when Module 292 is operationally configured and deployed in control system. A manifest may then be generated for Module 292 (step 420). In an embodiment, the manifest generated for the Module 292 may specify a generic router 244 that is adapted to interface with self-describing Module 292. The completed Module package 290 is then produced by IDE 210 (step 422). In an embodiment, the Module package 290 includes the generated manifest, the chosen SDK components, custom components, and the composite capabilities component 293 including the generated self-describing XML file 296. The Module creation routine cycle may then end (step 424).

Figure 5:
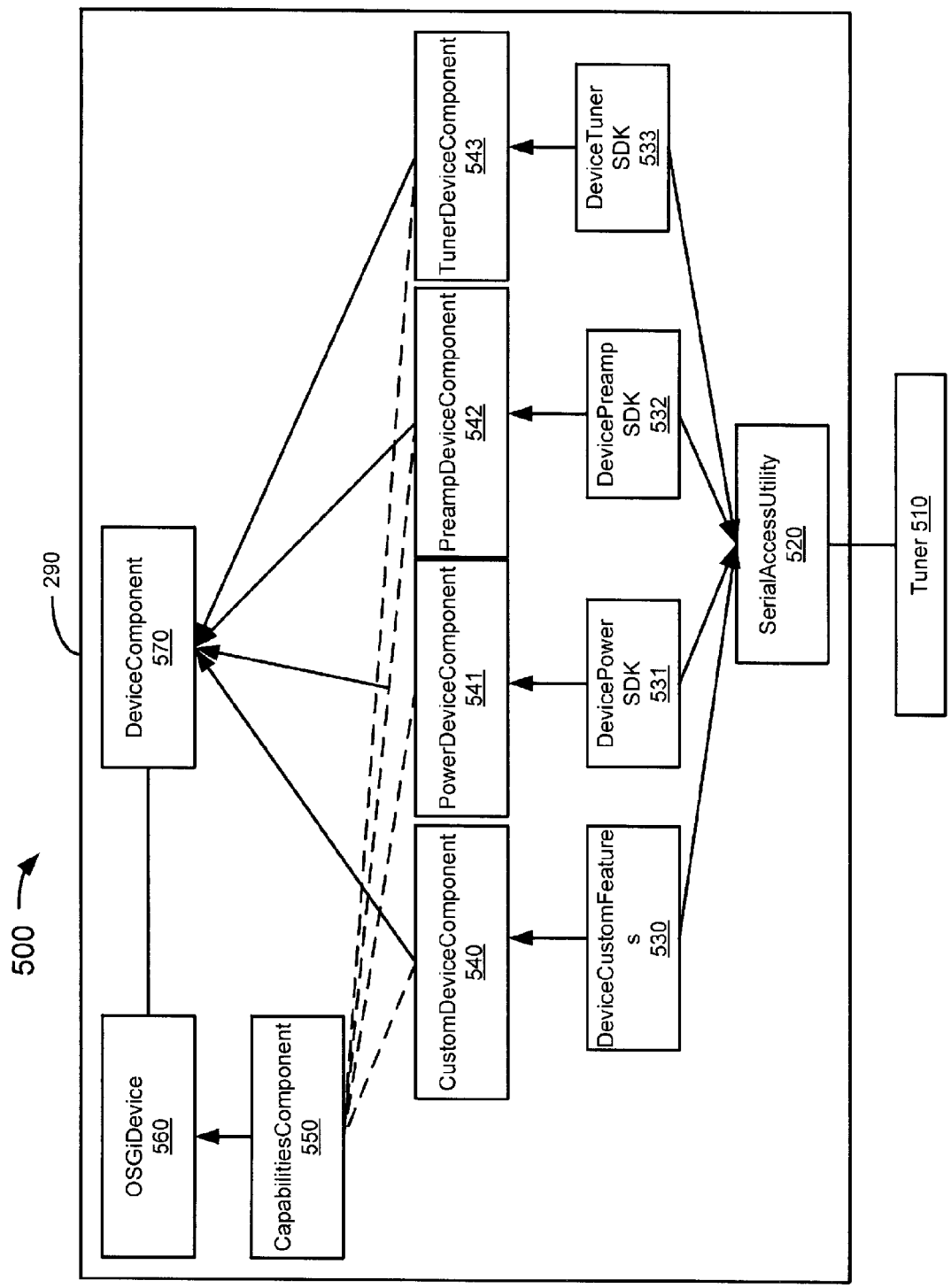
FIG. 5 is a diagrammatic representation of a Module package class structure implemented in accordance with disclosed embodiments.

FIG. 5 is a diagrammatic representation of a Module package 290 class structure 500 implemented in accordance with disclosed embodiments. Module package 290 may be implemented as instruction sets tangibly embodied on a computer-readable medium and executable by a processing system, such as development IDE 210.

In the illustrative example, the Module package 290 class structure 500 depicts an exemplary class diagram of a packaged Module for control of a controlled device comprising a tuner 510. The module package 290 may include various device SDK component classes including, for example, a Device Power SDK class 531, a Device Preamp SDK class 532, and a Device Tuner SDK class 533. Additionally, a Device Custom Features class 530 specifies custom commands or events specific to tuner 510. Corresponding device component classes are generated for each of the SDK classes and the custom class(es). For example, a Power Device Component class 541 is generated and included in the Module package that corresponds to the Device Power SDK class 531. Likewise, a Preamp Device Component class 542 is included in the Module package 290 that corresponds to the Device Preamp SDK class 532, and a Tuner Device Component class 543 is included in the Module package 290 that corresponds to the Device Tuner SDK class 533. A Custom Device Component class 540 is generated by the development IDE 210 and provides the API to the custom commands, events, and listeners specific to the tuner 510 that are provided by the Device Custom Functions class 530. All Device SDK Component classes 541-543 inherit from a Device Component base class 570 which provides a consistent interface to the OSGi framework.

Each of the Device SDK classes 531-533 comprise abstract classes that are selected by the Module developer. The Module developer specifies the interface APIs providing the functionality of the abstract SDK classes 531-533 thereby providing the requisite logic for the corresponding device component classes 541-543 to implement specific device access codes for properly interfacing with tuner 510. The Module developer specifies custom commands or events for defining the Device Custom Features class 530. Custom Device Component class 540 is generated by the development IDE 210 and provides the API to the custom commands, events, and listeners specific to the tuner 510 that are provided by the Device Custom Functions class 530. A utility access class, e.g., Serial Access Utility class 520, may be provisioned at the development IDE 210 to simplify development of device component classes 540-543 and corresponding API specifications for utility access via SDK Component classes 531-533 and custom classes, e.g., Device Custom Functions class 530.

In accordance with an embodiment, Module package 290 and control system 200 software entities are implemented in compliance with the OSGi framework, although other suitable frameworks may be substituted therefor. An OSGi Device class 560 and Capabilities class 550 are hidden from the Module developer. The OSGi Device class 560 provides interaction with the OSGi framework and is the communication point for all services outside the Module bundle. The Capabilities class 550 is generated by development IDE 210 and determines all the components and custom commands and listener events specified in the Module. In an embodiment, the Capabilities class 550 uses Java reflection to match the commands, parameters, and properties listed in the capabilities Object with the actual methods in the objects that satisfy the capabilities.

At startup, each Device Component class 540-543 will be queried for their runtime capabilities object that includes the commands, parameters, and properties offered by the Module as well as metadata including descriptions, parameters types, and valid ranges. Individual capabilities objects of Component classes 540-543 may be accumulated by the Capabilities class 550 for collection of composite capabilities of all device component classes 540-543. When queried, the OSGi Device class 560 obtains the composite capabilities from the Capabilities class 550 and returns a composite runtime capabilities object describing the capabilities of device 510. The OSGi Device class 560 exposes a service interface other services will use to invoke command or request parameter identifiers from the associated Capabilities Object.

In accordance with another embodiment, RMS 260 is comprised of an RMS server that communicates with remote monitoring agents 246 installed on master controller 240 to gather status or control the controlled devices 270-273 deployed in the control system. RMS 260 is modified with respect to a legacy RMS, e.g., RMS 160, to consume, understand, and control self-describing Modules, such as Module 292.

Remote monitoring agents are ported from NetLinx to a Java environment in the form of three Modules: an RMS core Module 246a, an RMS scheduling Module 246b, and an RMS dialog Module 246c. RMS scheduling and dialog Modules 246b-246c are "add on" applications.

The RMS Modules 246a-246c are configured to describe their capabilities through capabilities objects. However, the RMS Modules 246a-246c do not use the component SDK class structure because they are applications and thus do not represent a device.

Remote monitoring agent 246 is loaded on the master controller 240 in the same manner as other Modules. When integration IDE 230 is configured to consume and process self-describing Modules, e.g., Module 292, it will likewise be configured to consume and understand RMS Modules natively.

Router 244 is implemented to query and expose the capabilities of the RMS Modules 246a-246c. NetLinx-based devices may use router 245 to access RMS capabilities and participate in the RMS monitoring system.

Remote monitoring agent 246 is configured to use native OSGi methods to discover and access all self-describing Modules, e.g., Module 292, active on master controller 240. Agent 246 then queries each Module to determine its version. If the version indicates a self-describing Module, the agent 246 will request the Module return a capabilities object. If the version indicates a non-self describing Module, the module.xml file packaged in the module's jar file will be examined to discover its device type and capabilities. The RMS agent will generate a sparsely populated capabilities object from the retrieved module.xml file to describe the corresponding non-self describing Module.

The remote monitoring agent 246 may register each device 270 associated with a self-describing Module 292 by sending a registration to the RMS 260 server. The device registration may include the self-describing Module's XML file 296 that provides a description of the capabilities exposed on the controlled device 270.

The remote monitoring agent 246 utilizes the capabilities object 298 from each self-describing Module 292 to request status or invoke commands on the corresponding self-describing Module 292. The remote monitoring agent 246 may use reflection on legacy, non-self describing Modules to match the Module's capabilities with associated methods to invoke corresponding capabilities. The remote monitoring agent 246 will simply request status or command invocation from self-describing Modules as they will handle their own reflection on their internal components.

The RMS 260 server will use the device's XML description to construct a GUI display for administrators to allow selection of properties to monitor, view acceptable ranges, and invoke commands to control the device. The RMS 260 server may require registration for controlled devices in a self-describing XML format. The remote monitoring agent 246 is responsible for producing this XML from devices controlled by non-self describing Modules, self-describing Modules, or NetLinx code.

When a remote monitoring agent 246 is installed on master controller 240, devices controlled by master controller 240 with corresponding device capabilities will appear on the RMS 260 server GUI for the administrator to configure and control.

Remote monitoring agent 246 will automatically discover and describe the standard and custom capabilities of all active Modules. RMS 260 is advantageously not tied to any version of device SDK APIs since the module.xml file of non-self describing Modules will be available to describe corresponding Modules and self-describing Modules will describe themselves.

In accordance with embodiments, mechanisms for the discovery and registration of controlled devices associated with self-describing Modules in a control system are provided. A controlled device associated with a self-describing module is coupled with a master controller on which the self-describing module is installed. A remote monitoring system is communicatively coupled with the master controller, and a remote monitoring system agent is installed on the master controller. The agent discovers a Module associated with the controlled device and queries the Module for a version thereof. The agent then evaluates whether the Module is self-describing. In the event the Module is self-describing, the agent requests a run-time capabilities object from the Module and registers the controlled device with the remote monitoring system according to the capabilities object. In the event a Module associated with another device is discovered that is not self-describing, the agent may generate a capabilities object and register the other device with the remote monitoring system according to the generated capabilities object.

Figure 6:
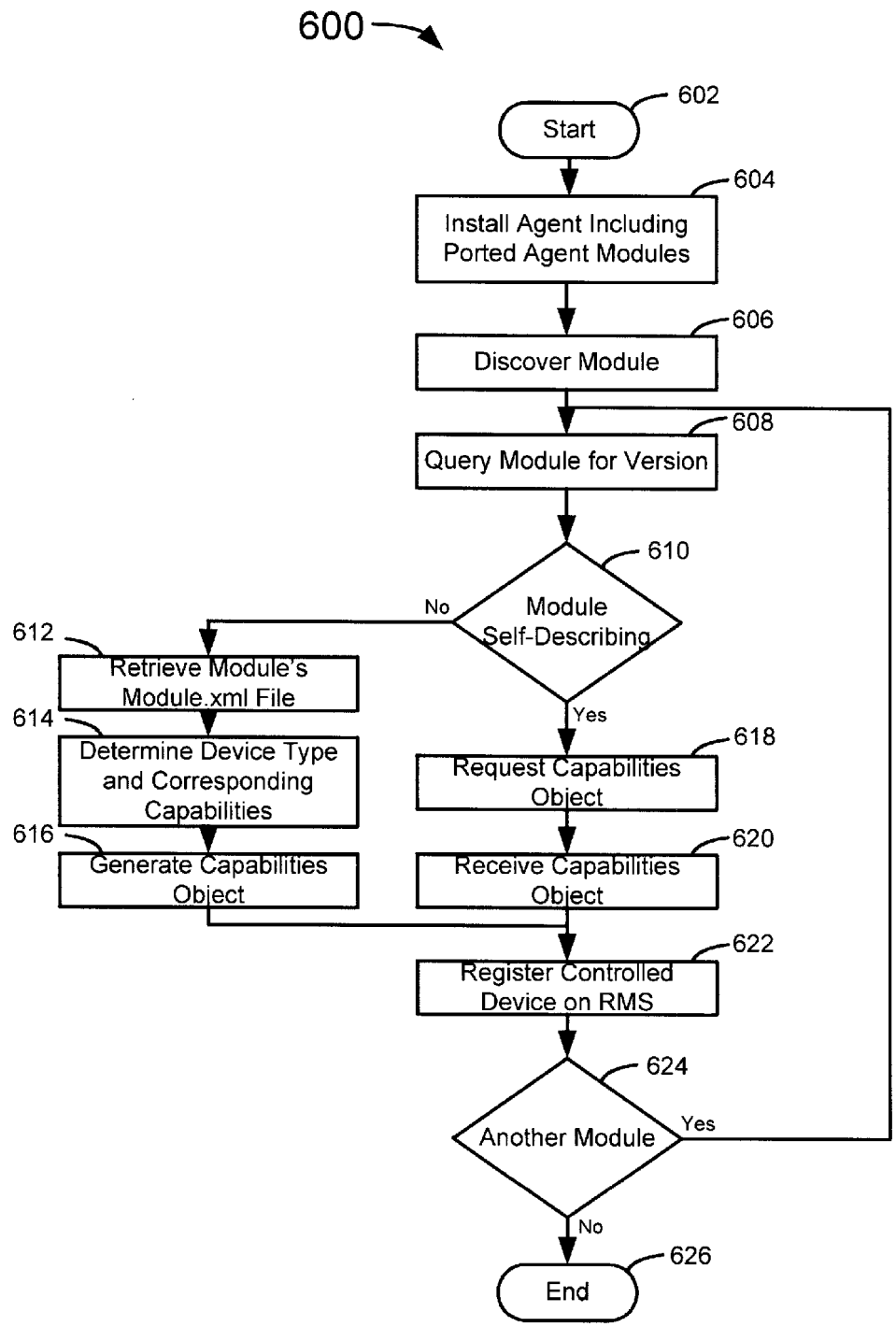
FIG. 6 is a flowchart that depicts processing of a remote monitoring system agent discovery and registration routine in accordance with an embodiment.

FIG. 6 is a flowchart 600 that depicts processing of a remote monitoring agent discovery and registration routine in accordance with an embodiment. The processing steps of FIG. 6 may be implemented as computer-executable instructions executable by a processing system, such as processing of the remote monitoring agent by master controller 240 depicted in FIG. 2.

The discovery and registration routine is invoked (step 602), and the remote monitoring agent including ported Modules 246a-246c is installed at the master controller (step 604). The remote monitoring agent 246 then discovers a Module, e.g., by using native OSGi methods (step 606). Upon discovery of a Module, the remote monitoring agent 246 queries the Module for the Module version (step 608). The remote monitoring agent then evaluates the Module version to determine if the Module comprises a self-describing Module (step 610). In the event the Module is not a self-describing Module, the RMS agent may then obtain the Module's Module.xml file, e.g., from the Module's jar file (step 612). The remote monitoring agent then determines the device type and corresponding capabilities (step 614) and thereafter generates a capabilities object for the non-self describing Module (step 616). The discovery and registration routine may then register the controlled device associated with the Module on the RMS 260 (step 622).

Returning again to step 610, if the Module is evaluated as a self-describing Module, the remote monitoring agent then issues a request to the Module for the Module's capabilities object (step 618), and awaits receipt of the capabilities object (step 620). The remote monitoring agent then registers the controlled device on the RMS according to the capabilities object according to step 622.

The remote monitoring agent then may attempt to discover another Module (step 624), and if one is identified, the remote monitoring agent queries the Module for the Module version according to step 608. When no additional Modules are discovered by the RMS agent, the discovery and registration routine cycle ends (step 626).

Figure 7:
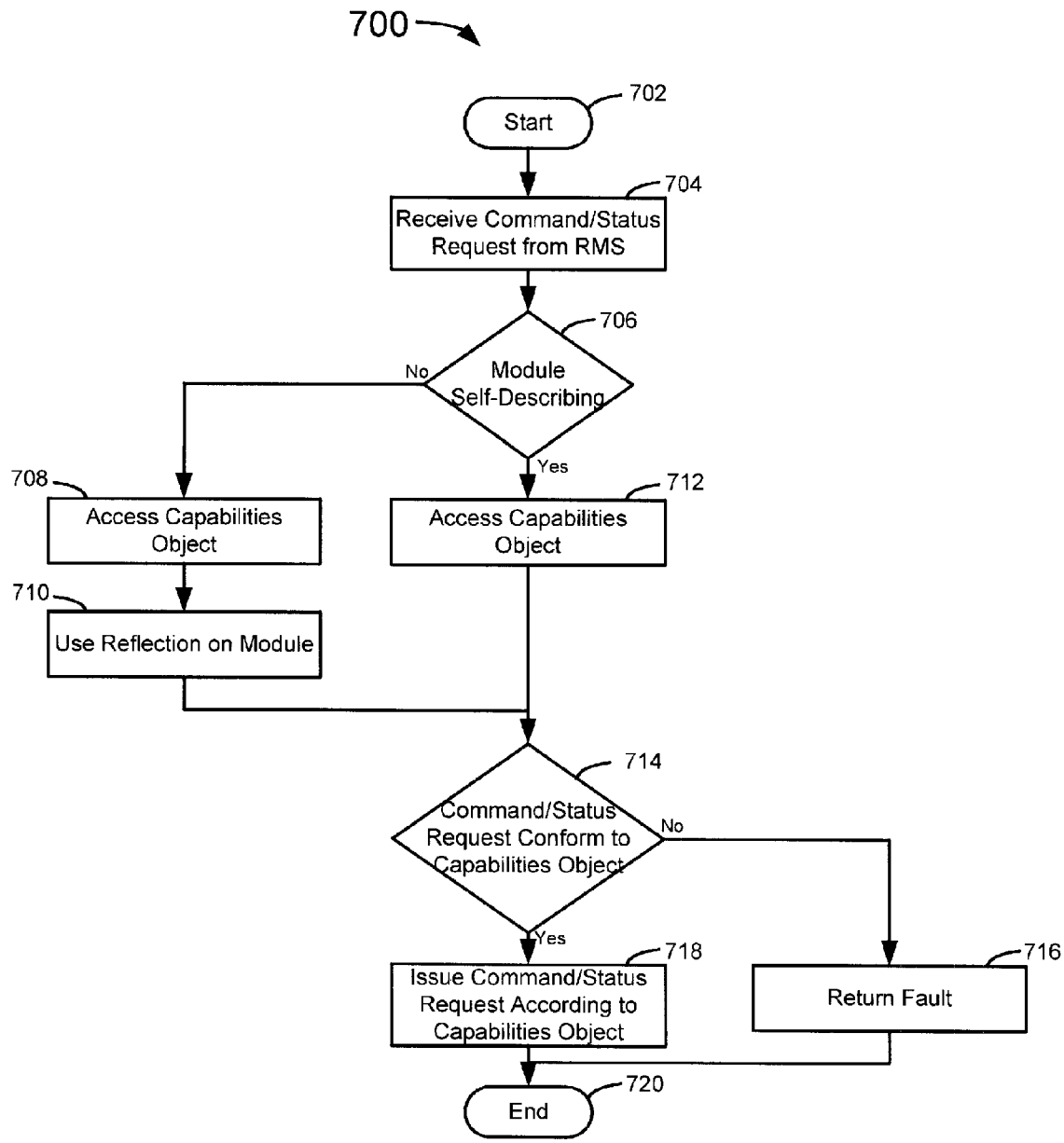
FIG. 7 is a flowchart that depicts processing of a control routine for controlling or accessing a controlled device in accordance with an embodiment.

FIG. 7 is a flowchart 700 that depicts processing of a control routine for controlling or accessing a controlled device in accordance with an embodiment. The processing steps of FIG. 7 may be implemented as computer-executable instructions executable by a processing system, such as processing of the remote monitoring agent by master controller 240 depicted in FIG. 2.

The control routine is invoked (step 702), and the remote monitoring agent receives a command or status request to be performed on a controlled device from RMS 260 (step 704). The remote monitoring agent then evaluates whether the Module of the corresponding controlled device is self-describing (step 706). In the event the Module is not self-describing, the remote monitoring agent may then access the capabilities object of the Module (step 708), e.g., the capabilities object generated at step 616, and thereafter use reflection on the Module (step 710). The command/status request may then be evaluated for conformance with the capabilities object (step 714).

Returning again to step 706, in the event the Module is identified as self-describing, the remote monitoring agent may then access the capabilities object, e.g., the run-time capabilities object obtained at step 620, of the self-describing Module (step 712) and evaluate whether the command/status request conforms to the capabilities object according to step 714. If the command/status request does not conform to the capabilities object, the remote monitoring agent may issue a fault (step 716), and the control routine cycle may then end (step 720). If the command/status request conforms to the capabilities object, the command/status request may then be invoked (step 718), and the control routine cycle may then end according to step 720.

As described, mechanisms for the discovery and registration of controlled devices associated with self-describing Modules in a control system are provided. A controlled device associated with a self-describing module is coupled with a master controller on which the self-describing module is installed. A remote monitoring system is communicatively coupled with the master controller, and a remote monitoring system agent is installed on the master controller. The agent discovers a Module associated with the controlled device and queries the Module for a version thereof. The agent then evaluates whether the Module is self-describing. In the event the Module is self-describing, the agent requests a run-time capabilities object from the Module and registers the controlled device with the remote monitoring system according to the capabilities object. In the event a Module associated with another device is discovered that is not self-describing, the agent may generate a capabilities object and register the other device with the remote monitoring system according to the generated capabilities object.

The flowchart of FIGS. 4 and 6-7 depict process serialization to facilitate an understanding of disclosed embodiments and are not necessarily indicative of the serialization of the operations being performed. In various embodiments, the processing steps described in FIGS. 4 and 6-7 may be performed in varying order, and one or more depicted steps may be performed in parallel with other steps. Additionally, execution of some processing steps of FIGS. 4 and 6-7 may be excluded without departing from embodiments disclosed herein.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   discovering a module associated with a controlled device by an agent associated with a remote monitoring system;
   evaluating whether the module is self-describing at runtime and before installation of the module;

responsive to determining that the module is self-describing, requesting a run-time capabilities object of an object-oriented programming language from the module;
receiving the run-time capabilities object; and
registering the controlled device with the remote monitoring system according to the run-time capabilities object.

2. The method of claim 1, wherein discovering the module comprises discovering the module by invoking an OSGi method by the agent.

3. The method of claim 1, further comprising:
querying each of a plurality of device component classes for their respective run-time capabilities objects comprising commands, parameters, and properties; and
accumulating the run-time capabilities of the plurality of device component classes into a device capabilities class.

4. The method of claim 1, wherein evaluating whether the module is self-describing comprises evaluating the version of the module.

5. The method of claim 1, further comprising:
receiving a command for an operation to be performed on the controlled device;
determining the module is self-describing;
accessing the capabilities object; and
invoking the command responsive to determining the command conforms to the capabilities object.

6. The method of claim 1, further comprising:
discovering a second module associated with a second controlled device by the agent;
evaluating whether the second module is self-describing;
responsive to determining the second module is not self-describing, determining a device type and capabilities corresponding thereto; and
generating a second capabilities object based on the capabilities corresponding to the device type.

7. The method of claim 6, further comprising registering the second controlled device with the remote monitoring system according to the second capabilities object.

8. The method of claim 7, further comprising:
receiving a command for an operation to be performed on the second controlled device;
determining the second module is not self-describing;
accessing the second capabilities object;
performing reflection on the second capabilities object; and
invoking the command responsive to determining the command conforms to the second capabilities object.

9. A non-transitory computer-readable medium comprising computer-executable instructions for execution by a processing system, the computer-executable instructions, when executed, configured to cause the processing system to:
discover a module associated with a controlled device by an agent associated with a remote monitoring system;
query the module for a version of the module;
evaluate whether the module is self-describing at runtime and before installation of the module;
responsive to determining that the module is self-describing, request a run-time capabilities object of an object-oriented programming language from the module;
receive the run time capabilities object; and
register the controlled device with the remote monitoring system according to the run-time capabilities object.

10. The non-transitory computer-readable medium of claim 9, wherein the instructions that discover the module comprise instructions that, when executed, cause the processing system to invoke an OSGi method by the agent.

11. The non-transitory computer-readable medium of claim 9, wherein the instructions that evaluate whether the module is self-describing comprise instructions that, when executed, cause the processing system to evaluate the version of the module.

12. The non-transitory computer-readable medium of claim 9, further comprising instructions that, when executed, cause the processing system to:
receive a command for an operation to be performed on the controlled device;
determine the module is self-describing;
access the capabilities object; and
invoke the command responsive to determining the command conforms to the capabilities object.

13. The non-transitory computer-readable medium of claim 9, further comprising instructions that, when executed, cause the processing system to:
discover a second module associated with a second controlled device by the agent;
evaluate whether the second module is self-describing;
responsive to determining the second module is not self-describing, determine a device type and capabilities corresponding thereto; and
generate a second capabilities object based on the capabilities corresponding to the device type.

14. The non-transitory computer-readable medium of claim 13, further comprising instructions that, when executed, cause the processing system to register the second controlled device with the remote monitoring system according to the second capabilities object.

15. The non-transitory computer-readable medium of claim 14, further comprising instructions that, when executed, cause the processing system to:
receive a command for an operation to be performed on the second controlled device;
determine the second module is not self-describing;
access the second capabilities object;
perform reflection on the second capabilities object; and
invoke the command responsive to determining the command conforms to the second capabilities object.

16. A control system, comprising:
a controlled device having a self-describing module associated therewith;
a remote monitoring system; and
a master controller on which the self-describing module and an agent associated with the remote monitoring system are installed, wherein the agent is configured to discover the module,
queries the module for a version of the module,
evaluates whether the module is self-describing at runtime and before installation of the module,
determines that the module is self-describing,
requests a run-time capabilities object of an object-oriented programming language from the module responsive to determining that the module is self-describing,
receives the run-time capabilities object, and
registers the controlled device with the remote monitoring system according to the run-time capabilities object.

17. The system of claim 16, wherein the agent determines the module is self-describing by evaluating the version of the module.

18. The method of claim 16, wherein the agent receives, from the remote monitoring system, a command for an operation to be performed on the controlled device, accesses the capabilities object, and invokes the command responsive to determining the command conforms to the capabilities object.

19. The system of claim 16, wherein the agent discovers a second module associated with a second controlled device, evaluates whether the second module is self-describing, determines a device type and capabilities corresponding thereto responsive to determining the second module is not self-describing, and generates a second capabilities object based on the capabilities corresponding to the device type.

20. The system of claim 19, wherein the agent registers the second controlled device with the remote monitoring system according to the second capabilities object.

* * * * *